United States Patent [19]

Hattori et al.

[11] Patent Number: 4,891,039

[45] Date of Patent: Jan. 2, 1990

[54] POWER TRANSMITTING V-BELT

[75] Inventors: Torao Hattori; Shigeru Kanehara, both of Saitama, Japan

[73] Assignee: Honda Giken Kogyo Kabushiki Kaisha, Tokyo, Japan

[21] Appl. No.: 202,899

[22] Filed: Jun. 6, 1988

[30] Foreign Application Priority Data

Jun. 5, 1987 [JP] Japan .............................. 62-86769[U]
Jun. 5, 1987 [JP] Japan .............................. 62-86770[U]

[51] Int. Cl.[4] .............................................. F16G 1/22
[52] U.S. Cl. .................................................... 474/242
[58] Field of Search ............... 474/201, 237, 240, 242, 474/244, 245

[56] References Cited

U.S. PATENT DOCUMENTS 4,512,753 4/1985 Hattori ............................... 474/242
4,560,371 12/1985 Hattori ............................... 474/201

Primary Examiner—Thuy M. Bui
Attorney, Agent, or Firm—Lyon & Lyon

[57] ABSTRACT

A power transmitting V-belt comprising an endless metal band mounted on supporting surfaces of a multiplicity of V-shaped metal blocks so linked to one another that adjacent blocks are rotatable relative to each other around an axis which is located substantially on the block contact surface of the band that engages the supporting surfaces of the metal blocks. This minimizes relative slippage between the metal band and the metal blocks during running of the V-belt.

15 Claims, 6 Drawing Sheets

POWER TRANSMITTING V-BELT

BACKGROUND OF THE INVENTION

1. Field of the Invention

The present invention relates to a power transmitting V-belt and, more particularly, to a power transmitting V-belt which is used in combination with a variable-diameter V-pulley.

2. Description of the Prior Art

Power transmitting V-belts which are used in combination with variable-diameter V-pulleys for vehicular V-belt type continuously variable transmissions, for example, are known from U.S. Pat. No. 4,552,548. The V-belt known from this patent is of the type having a multiplicity of V-shaped metal blocks which are connected with each other and which are provided with supporting surfaces for restraining and supporting an endless metal band thereon. Adjacent metal blocks can rotate relative to each other around respective axes which extend in the widthwise direction of the metal band.

In such a prior art structure, the axis around which the V-shaped metal block can rotate relative to its adjacent metal block is located apart from the block contact surface of the metal band carried on the supporting surfaces of these metal blocks to a position where at the time of engagement of the V-belt with a V-pulley the axis comes closer to the center of the pulley than the block contact surface of the metal band. Therefore, when during operation the V-belt is shifted from a straightforward running region to a turning region wherein the V-belt is wrapped around the V-pulley and bent around the center of the V-pulley, or is shifted from the turning region to the straightforward running region, the adjacent metal blocks perform a relative rotation with respect to each other around said axis and as a result the clearance between the blocks at portions thereof where the metal band supporting surfaces are located substantially increases or decreases. This causes slippage between the supporting surface of the metal block and the block contact surface of the metal band which is carried on said supporting surface to accelerate wear of these mating surfaces and generate slackening of the band on the blocks, disadvantageously lowering the durability of the V-belt.

SUMMARY OF THE INVENTION

The present invention has been proposed in view of the afore-mentioned problems residing in the prior art and its purpose is to provide a power transmitting V-belt which will not allow a large slip to occur between the metal band and the metal blocks and therefore permit only a small amount of wear to appear in the metal band and the metal blocks even after long period of use, thus making the power transmission very efficient.

In order to achieve the above purpose, according to the invention, it is arranged that the axis around which adjacent V-shaped metal blocks rotate relative to each other is located substantially on the block contact surface of the metal band which comes into contact with the supporting surfaces of the metal blocks.

With this arrangement, when the V-belt moves from the straightforward running region into the turning region where it comes into engagement with a V-pulley or from the turning region to the straightforward running region, even if the adjacent metal blocks rotate relatively to each other around the axis, the clearance between the adjacent blocks at the portions thereof where the supporting surfaces for receiving the metal band are formed hardly changes. Therefore, the supporting surfaces of the metal blocks and the block contact surface of the metal band do not generate substantial slippage therebetween, thus enabling the V-belt to have high durability and excellent power transmitting efficiency.

The above and other objects, features and advantages of the invention will be apparent from a reading of the following description of some preferred embodiments of the invention made in conjunction with the accompanying drawings.

BRIEF DESCRIPTION OF THE DRAWINGS

The accompanying drawings show some embodiments according to the invention wherein:

FIGS. 1-3 show a first embodiment, in which FIG. 1 is a sectional side view taken along the line I—I of FIG. 2 of a V-belt according to this embodiment located in an area engaging a V-pulley, FIG. 2 is a view taken in the direction of arrow II in FIG. 1 and FIG. 3 is a sectional view taken along the line III—III of FIG. 1;

FIGS. 4 and 5 show a second embodiment, in which FIG. 4 is a front view of a V-shaped metal block according to this embodiment and FIG. 5 is a sectional view taken along the line V—V of FIG. 4; and FIGS. 6-14 show a third embodiment, in which FIG. 6 is a side view of a V-belt according to this embodiment, similar to FIG. 1, FIG. 7 is a front view of a first metal block, FIG. 8 is a side view of the same, FIG. 9 is a rear view of the same, FIG. 10 is a sectional view taken along the line X—X of FIG. 9, FIG. 11 is a front view of a second metal block, FIG. 12 is a side view of the same, FIG. 13 is a rear view of the same, and FIG. 14 is a sectional view taken along the line XIV—XIV of FIG. 13.

DESCRIPTION OF PREFERRED EMBODIMENTS

Some preferred embodiments according to the present invention will be described hereinafter with reference to the accompanying drawings.

Figure 1:
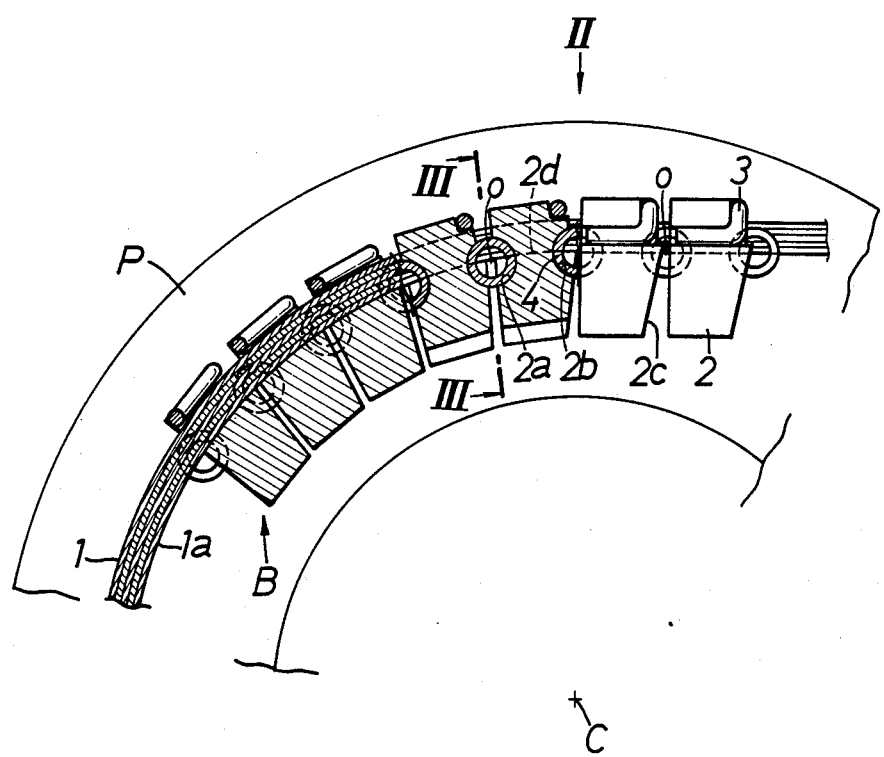
Figure 2:
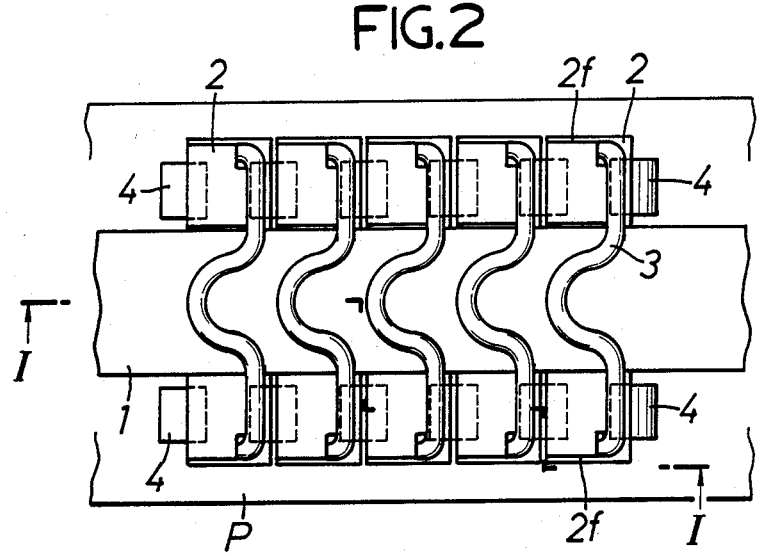
Figure 3:
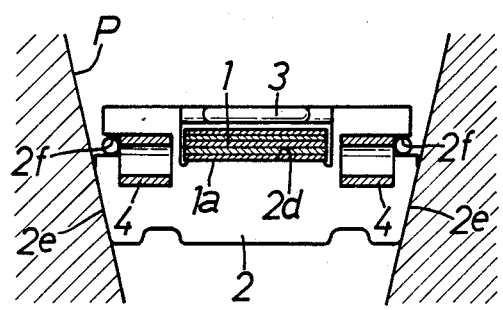

FIGS. 1-3 show a first embodiment. As clearly shown in FIG. 1, a V-belt B according to this embodiment comprises a metal band 1 formed by laminating a plurality of endless metal band elements, a multiplicity of V-shaped metal blocks 2, 2 . . . which are aligned with and connected to one another via cylindrical roller members 4, 4 . . . interposed therebetween so as to extend in the longitudinal direction of the metal band 1 for supporting the lower surface or block contact surface 1a of the metal band 1, and stopper members 3, 3 . . . made of wire material adapted to restrain the metal band 1 onto the metal blocks 2, 2 . . . by engaging respective opposite ends thereof in respective pairs of left and right engaging grooves 2f, 2f provided on the V-shaped metal blocks.

Each V-shaped metal block 2 is formed on opposite side surfaces thereof facing in the longitudinal direction of the metal band 1 with respective pairs of semicylindrical recesses 2a, 2a and 2b, 2b with a distance between the recesses of each pair in the widthwise direction of the metal band 1. Each of the metal blocks 2, 2 . . . further has on one of said opposite side surfaces, on which one pair of recesses 2b, 2b are provided, an inclined surface 2c formed so as to provide a spacing from the adjacent metal block 2 which becomes larger as the distance from the recesses 2b, 2b increases. As clearly shown in FIG. 3, a recessed groove, unnumbered, having an upper side open is formed on an upper portion of each V-shaped metal block 2, that is, on a wall portion thereof which is located on a side opposite or remote from a center C of V-pulley P (FIG. 1) when the V-belt B engages the V-pulley P. The bottom of this recessed groove serves as a supporting surface 2d for supporting the block contact surface 1a of the metal band 1 thereon. Further, lateral opposite side surfaces of the V-shaped metal block 2 are formed to include inclined surfaces 2e, 2e for engagement with the V-shaped groove of V-pulley P.

As described above, adjacent V-shaped metal blocks 2, 2 achieve their mutual connection by interposing the roller members 4, 4 between the pairs of recesses 2a, 2a and 2b, 2b which are opposed to each other in assembly and these adjacent metal blocks 2, 2 can rotate relatively to each other around the axis o of the roller members 4, 4. In other words, the axis around which the metal blocks 2, 2 perform relative rotation coincides with the axis of roller members 4, 4 in this embodiment. Moreover, according to the invention, the axis of relative rotation of the metal blocks is substantially located on the block contact surface 1a of the metal band 1 which is restrained and mounted onto the supporting surfaces 2d of the metal blocks 2 by means of the stopper members 3.

In order to achieve this arrangement, the respective pairs of semicylindrical recesses 2a, 2a and 2b, 2b are constructed in such a special manner that their center lines are substantially located on the mounting surface 2d or its extension plane.

The aforementioned recesses 2a, 2b may be formed of a larger radius than that of the roller members 4 in order to give an automatic centering action therebetween. Even in this type of arrangement, the recesses 2a, 2b are positioned on the metal block 2 such that the axis of the roller member 4 is located substantially on the block contact surface 1a of the metal band 1.

Furthermore, the axial position of each roller member 4 within the recess 2a, 2b is restricted by opposite axial ends of the roller member 4 abutting against the end surfaces of the semicylindrical recess 2a, 2b.

The operation of this embodiment will next be described.

Since the axis of relative rotation of adjacent V-shaped metal blocks 2, 2, that is, the axis o of the roller members 4, is located substantially on the block contact surface 1a of the metal band 1, when the V-belt B has passed its straightforward running region and enters its turning region or engagement area with the V-pulley P while bending around the center C of V-pulley P, the adjacent two metal blocks 2, 2 rotate relatively to each other around said axis o thereby to cause the clearance between lower parts of the adjacent metal blocks 2, 2, that is, the clearance between the inclined surface 2c of one metal block 2 and the opposed surface of the other metal block 2 located close to the center C of V-pulley P, to be reduced and simultaneously the clearance between the upper parts of those blocks 2, 2, that is, the clearance between portions of the blocks remote from the pulley center C, to be increased. However, even with this relative rotation, the block contact surface 1a of the metal band 1 which is restrained and supported on the supporting surfaces 2d, 2d of the V-shaped metal blocks 2, 2 keeps its coincident relation with the axis of such relative rotation and the clearance between the blocks 2, 2 at their portions provided with the supporting surfaces 2d, 2d does not change so that no substantial slippage occurs between the supporting surfaces and the block contact surface and accordingly the metal band 1 is allowed to smoothly follow the turning run of the metal blocks 2, 2 . . . around the center C of V-pulley P while holding an abutting state at its block contact surface 1a against the supporting surfaces 2d, 2d . . . without causing slippage.

This also applies to the case where the V-belt B is shifted from the turning region to the straightforward running region, in which case no slippage occurs between the block contact surface 1a of metal band 1 and the supporting surfaces 2d of metal blocks 2.

Due to this, even after the V-belt B has been used for a long period of time, the amount of wear at contact portions between the metal band 1 and the metal blocks 2 is suppressed to a minimum and slackening of the V-belt B can be eliminated to keep the power transmitting efficiency at a desirable level.

Figure 4:
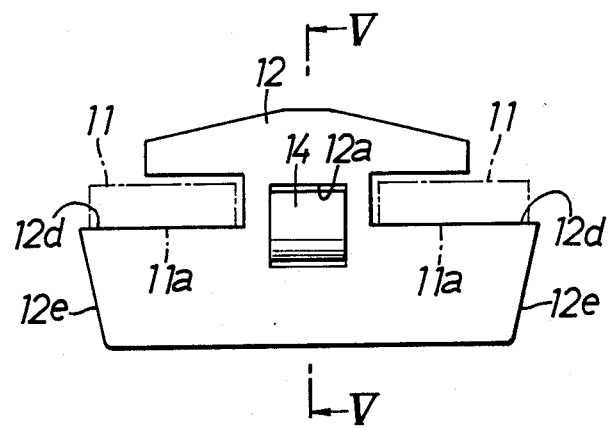
Figure 5:
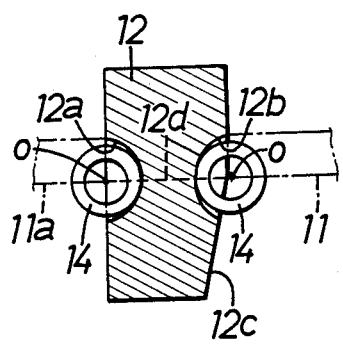

FIGS. 4 and 5 show a V-shaped metal block 12 constituting a V-belt according to a second embodiment. In this embodiment, semicylindrical recesses 12a, 12b are formed on opposite side surfaces of the metal block 12 at laterally central portions thereof, which is different from the foregoing embodiment. In correspondence thereto, one roller member 14 engages in the opposed recesses 12a, 12b of two adjacent metal blocks in a manner to be interposed therebetween. Furthermore, unlike the first embodiment, a pair of left and right metal bands 11, 11 are used in this embodiment and they are restrained and mounted onto a pair of left and right supporting surfaces 12d, 12d, respectively, by stopper members, not shown. The mounting surfaces 12d, 12d are provided on the metal block 12 so as to interpose the recesses 12a, 12b therebetween.

In this embodiment, as shown in FIG. 5, the recesses 12a, 12b are formed to have a larger radius than that of the roller member 14 and are located on the metal block 12 at such positions that when assembled the roller member 14 engaged in the recesses has its axis o substantially coincident with block contact surfaces 11a, 11a of the metal bands 11, 11 which abut against the supporting surfaces 12d, 12d of the metal block 12.

FIGS. 6–14 show a third embodiment. A V-belt B' according to this embodiment is formed by an appropriate combination of two kinds of V-shaped metal blocks which are aligned with each other.

That is, V-shaped metal blocks according to this embodiment comprise a first metal block 22 which is shown in detail in FIGS. 7–10 and a second metal block 32 shown in detail in FIGS. 11–14.

The first metal block 22 is formed with a pair of semicylindrical recesses 22a, 22a on one side surface as viewed in the longitudinal direction of a metal band 21. The pair of recesses 22a, 22a are spaced from each other in the widthwise direction of the metal band 21. On the other side surface of the block 22 are formed a pair of semicylindrical projections 22g, 22g having a widthwise spacing therebetween like the recesses 22a, 22a. When assembling two metal blocks 22, 22 of this first kind with each other, the pair of projections 22g, 22g on the side surface of one first metal block 22 is placed in abutment against the pair of recesses 22a, 22a on the opposed side surface of the other first metal block 22.

Figure 7:
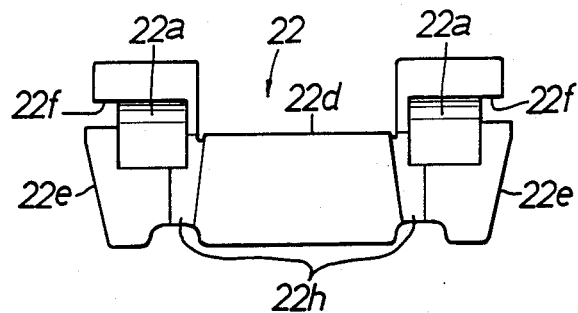
Figure 8:
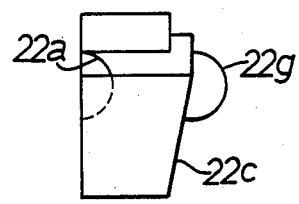
Figure 9:
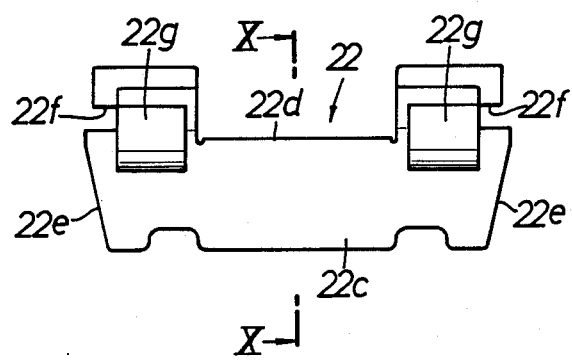
Figure 10:
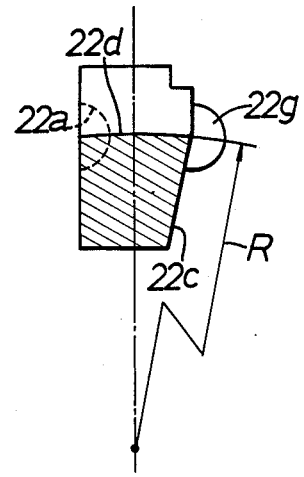
Figure 11:
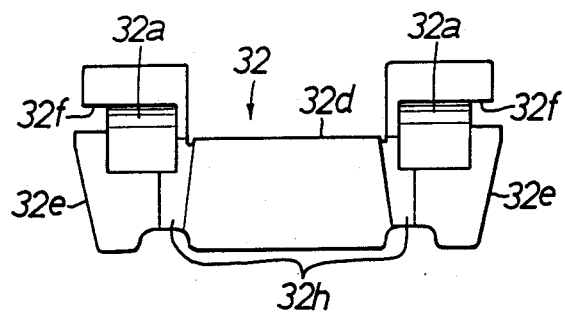
Figure 12:
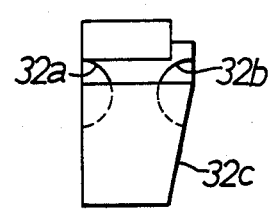
Figure 13:
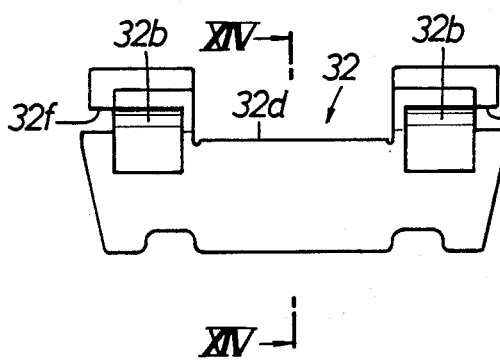
Figure 14:
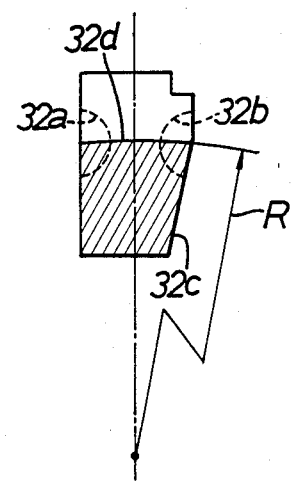

As illustrated in FIG. 10, the first metal block 22 has a supporting surface 22d for carrying thereon a block contact surface 21a of the metal band 21 and this supporting surface 22d is formed into an arcuate surface having a radius equal or approximate to the minimum bending radius R of the metal band 21 which corresponds to the minimum effective radius of a V-pulley P'. The first metal block 22 is further formed with a pair of oil feed grooves 22h, 22h with a widthwise spacing therebetween, as shown in FIG. 7, for lubrication of relative rotating parts of the block, on that side surface which includes the recesses 22a, 22a.

In the Figures, reference numeral 22c designates an inclined surface provided on a lower part of one side surface having the projections 22g, 22g, that is, on the part closer to the center C' of V-pulley P'; reference numerals 22e, 22e designate inclined surfaces engaged with a V groove of the V-pulley P'; and reference numerals 22f, 22f designate engaging grooves for receiving opposite ends of a stopper member 23 made of wire material for restraining the metal band 21 on the supporting surface 22d.

The second metal block 32 has a pair of semicylindrical recesses 32a, 32a formed on one side surface facing in the longitudinal direction of the metal band 21 and spaced from each other in the widthwise direction of the band 21. The second metal block 32 also has a pair of semicylindrical recesses 32b, 32b on the other side surface with a spacing therebetween in the widthwise direction of the band. Moreover, the block 32 has a supporting surface 32d for receiving the block contact surface 21a of metal band 21 and this surface 32d is formed, like the supporting surface 22d of the first metal block 22, with an arcuate surface having a radius equal or approximate to the minimum bending radius R of the metal band 22 which corresponds to the minimum effective radius of the V-pulley P'.

In the Figures, reference numeral 32c denotes an inclined surface similar to the inclined surface 22c of first metal block 22 for avoiding contact with the adjacent metal block at the time of bending operation of the V-belt B'; reference numerals 32e, 32e denote inclined surfaces brought into engagement with the V groove of V-pulley P'; reference numerals 32f, 32f denote engaging grooves engaged by opposite ends of stopper member 23; and reference numerals 32h, 32h denote oil feed grooves.

When two of this second kind of metal blocks 32 are assembled with each other, cylindrical roller members 24 may be interposed between opposed recesses 32a, 32a and 32b, 32b, respectively to achieve a connected state or a pivotable linkage therebetween.

When the first metal block 22 and the second metal block 32 are assembled with each other, the pair of projections 22g, 22g of the first metal block 22 are placed in engagement with the pair of opposed recesses 32a, 32a of the second metal block 32, respectively, whereas when the recesses 22a, 22a of the first metal block 22 and the recesses 32b, 32b of the second metal block 32 face each other, roller members 24, 24 are disposed between the recesses.

Figure 6:
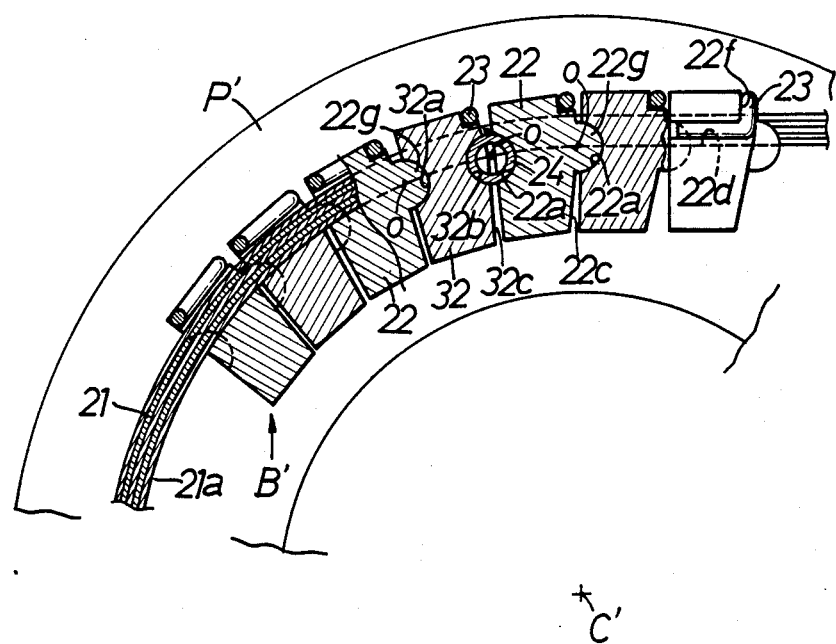

As shown in FIG. 6, in this third embodiment, the metal blocks constituting the V-belt B' consist of one second metal 183/92 block 32 and the remaining first metal blocks 22, 22 . . . . However, it is naturally possible to use a plurality of second metal blocks 32.

Like the foregoing embodiments, the recesses 22a, 32a and 32b and the projections 22b formed on the first and second metal blocks 22, 32 according to the third embodiment are arranged such that the axes of roller members 24 and projections 22b substantially coincide with the block contact surface 21a of metal band 21 which is carried on the respective supporting surfaces 22d, 32d of the metal blocks 22, 32. Accordingly, even when the V-belt B' bends at the turning region, there is no fear of causing a large slippage between the metal band 21 and the metal blocks 22, 32. Furthermore, since the supporting surfaces 22d, 32d of the first and second metal blocks 22, 32 are constructed as arcuate surfaces having their radii equal or approximate to the minimum bending radius R of the metal band 21 which corresponds to the minimum effective radius of the V-pulley P', it is ensured that even if adjacent metal blocks rotate or pivot a large amount with respect to each other around the axis o in response to the running operation of the V-belt B' coming into and going out of engagement with the V-pulley P' which then has a quite small effective radius, the block contact surface 21a of metal band 21 can intimately contact the arcuate supporting surfaces 22d, 32d of the metal blocks 22, 32 to eliminate the possibility of stress being generated at portions of the block contact surface 21a which face the edge portions of the supporting surfaces 22d, 32d. Thereby, the durability of the V-belt can be enhanced further.

Incidentally, in all of the afore-mentioned embodiments, the V-shaped metal blocks may be formed by using an iron-based sintered alloy, for example, and in such a case a block of a complicated shape can be obtained in a low cost way and its porous structure permits the block to be formed as a so-called oil impregnated metal product which would require no separate lubrication. This may contribute further to prevention of wear and noises and prolonged service life.

The roller member interposed between adjacent metal blocks may be formed of an elastomeric material such as hard rubber and synthetic resin and/or be made hollow in order to permit its resilient deformation when desired. This roller member can make it easy to assemble the metal blocks of the V-belt, particularly at the final assembling steps, and serve to prevent generation of slackening and noises due to wear and/or dimensional errors at parts thereof in contact with the mating recesses on the blocks, Various kinds of material and arbitrary sectional shape can be selected in combination for the roller member.

We claim:

1. A power transmitting V-belt comprising an endless metal band mounted on supporting surfaces of a multiplicity of V-shaped metal blocks which are aligned with one another with each V-shaped metal block being rotatable relative to an adjacent V-shaped metal block around an axis extending in a widthwise direction of said metal band, said axis being located on a block contact surface of the metal band which is in engagement with the supporting surfaces of the metal blocks.

2. A power transmitting V-belt according to claim 1, wherein each said V-shaped metal block has a pair of semicylindrical recesses formed on each of opposite side surfaces of said metal block with a spacing being provided between the recesses of each pair in the widthwise direction of the metal band.

3. A power transmitting V-belt according to claim 2, wherein each said supporting surface is provided at a laterally central part on the metal block between the recesses of each pair.

4. A power transmitting V-belt according to claim 1, wherein each said V-shaped metal block has one semicylindrical recess formed on each of opposite side surfaces of said metal block and said supporting surface comprises a pair or supporting surfaces on each metal block with said recesses interposed therebetween, and said metal band is comprised of two separate metal bands which are mounted on said pair of supporting surfaces, respectively.

5. A power transmitting V-belt according to claim 2, 3 or 4, wherein cylindrical roller members are interposed between the recesses on the side surfaces of the adjacent metal blocks which are opposed to each other, each said roller member having an axis aligned with said axis of relative rotation of the metal blocks associated therewith.

6. A power transmitting V-belt comprising an endless metal band mounted on supporting surfaces of a multiplicity of V-shaped metal blocks which are aligned with one another, with each V-shaped metal block being rotatable relative to an adjacent V-shaped metal block around an axis extending in a widthwise direction of said metal band, said axis being located substantially on a block contact surface of the metal band which is in engagement with the supporting surfaces of the metal blocks, wherein each said V-shaped metal block has a pair of semi-cylindrical recesses formed on each of opposite side surface of said metal block with a spacing being provided between the recesses of each pair in the widthwise direction of the metal band, wherein each said supporting surface is provided at a laterally central part on the meal block between the recesses of each pair and a single said metal band is employed, and wherein cylindrical roller members are interposed between the recesses on the side surfaces of the adjacent metal blocks which are opposed to each other, each said roller member having an axis aligned with said axis of relative rotation of the metal blocks associated therewith.

7. A power transmitting V-belt according to claim 5 or claim 6, wherein at least one of said roller members is formed of a material adapted to permit a resilient deformation of the roller member.

8. A power transmitting V-belt according to claim 1, said V-shaped metal blocks include at least first and second adjacent metal blocks, said first metal block having a semicylindrical recess formed on one of opposite side surfaces of said first metal block and a semicylindrical projection formed on the other side surface, and said second metal block having recesses formed on both of opposite side surfaces of said second metal block.

9. A power transmitting V-belt according to claim 2 or 8, wherein an oil feed groove is provided on at least one side surface of said metal blocks and intersects a semicylindrical recess.

10. A power transmitting V-belt according to claim 8, wherein the semicylindrical projection of the first metal block engages in the opposed recess formed on either of another adjacent first metal block or adjacent second metal block, and a roller member is interposed between the recesses of the first and second metal blocks which are adjacent to each other.

11. A power transmitting V-belt according to claim 10, wherein said recesses and projections are each provided in laterally spaced pairs on each of said side surfaces of the first and second metal blocks.

12. A power transmitting V-belt according to claim 10 or 11, wherein said roller member is formed of a material adapted to permit a resilient deformation of the roller member.

13. A power transmitting V-belt according to claims 1 or 6, wherein said V-shaped metal block is formed from a sintered alloy.

14. A power transmitting V-belt according to claims 1 or 6, wherein the supporting surfaces of said V-shaped metal blocks are formed into an arcuate surface.

15. A power transmitting V-belt according to claim 14, wherein said arcuate surface has a radius substantially equal to a minimum bending radius of the V-belt which corresponds to a minimum effective radius of a V-pulley with which the V-belt engages.

* * * * *